March 29, 1966     H. W. ANDERSEN     3,242,920
MANOMETER AND METHOD OF USING SAME
Filed June 7, 1963
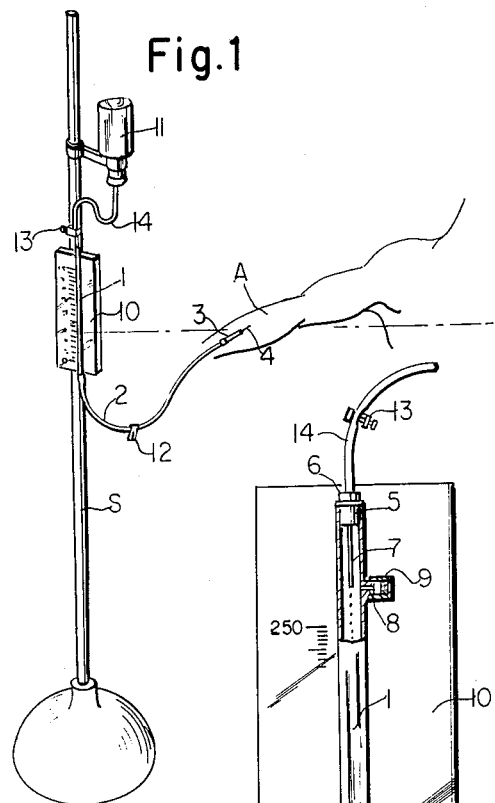
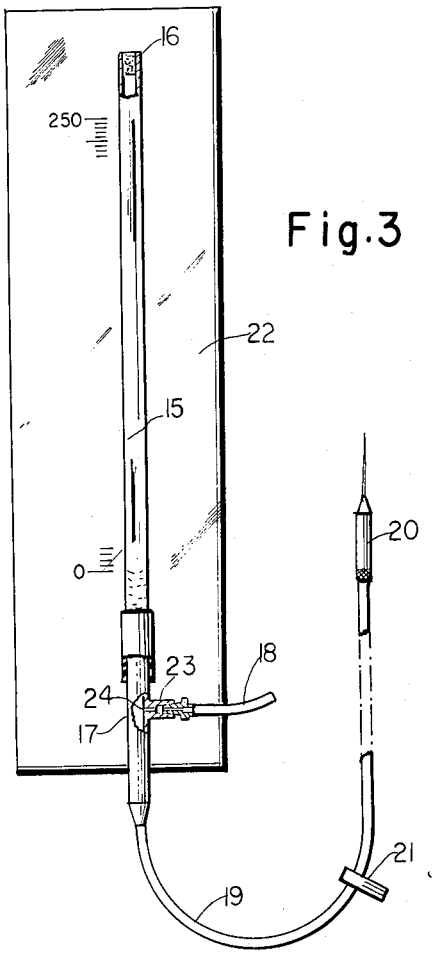
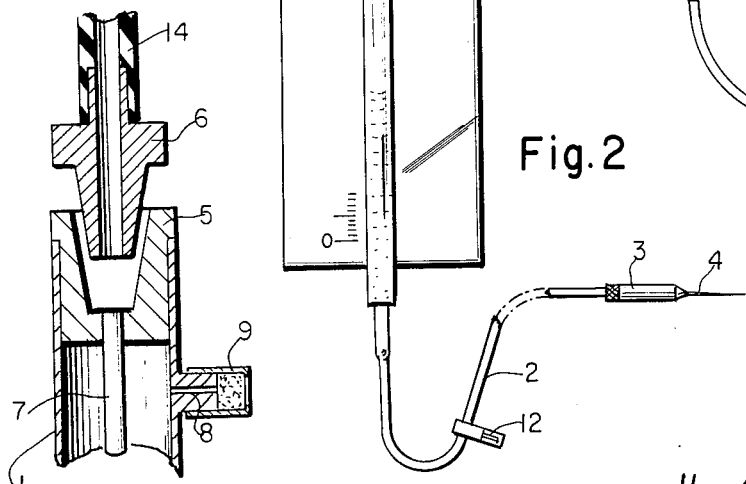
INVENTOR.
Harold W. Andersen
BY
Brown & Seward
ATTORNEYS

United States Patent Office 3,242,920
Patented Mar. 29, 1966

3,242,920
MANOMETER AND METHOD OF USING SAME
Harold W. Andersen, Oyster Bay, N.Y., assignor to H. W. Andersen Products, Inc., Oyster Bay, N.Y., a corporation of New York
Filed June 7, 1963, Ser. No. 286,371
7 Claims. (Cl. 128—2.05)

This invention relates to a manometer for measuring and indicating venous pressure or pressure of other fluids in the human body, and method of using same.

It is an object of the invention to provide a simple and accurate instrument, adapted for observation of constant or fluctuating fluid pressures over extended periods, and arranged to operate in such a manner that the pick-up needle cannot become obstructed, as by clotting. Such operation thus obviates any need for periodic flushing out of the tubing or needle and permits continuous uninterrupted measurement and observation of the pressures for as long as may be desired.

The accuracy of the venous pressure measured in a peripheral vein as an indicator of the venous pressure at the right side of the heart and hence an indicator of the venous return to the heart has been affirmed by many investigators over the past five decades. Since the advent of open heart operations this parameter has further proven its value. The strain gauge used to continuously measure intravascular pressures at the operating table is as accurate as it is cumbersome. The conventional type of side arm venous pressure manometer used at the bedside is useful, but has the disadvantage of only allowing intermittent measurements to be taken inasmuch as the manometer must be filled with solution for each measurement. This manometer would be much more useful if it could be modified so that it would display the peripheral venous pressure continuously. It is the purpose of this invention to modify the side arm manometer so that it continuously rises and falls with the variations in venous pressure.

Peripheral venous pressure is expressed in terms of the number of millimeters of water supported in a constant diameter tube by the hydraulic pressure within the vein. The standard reference or null point, by general agreement, is the approximate level of the right atrium of the heart. In the normal individual the venous pressure varies between 80 and 120 mm. in the resting state. In pathological states it may vary from —20 mm. to over 300 mm.

The conventional venous pressure manometer consists of a glass tube calibrated in millimeters and fastened to a three way stopcock. One side of the stopcock is connected via a flexible plastic tube to a hollow bore needle which is inserted into one of the patient's peripheral veins, usually a vein on the ventral surface of the forearm. The second side of the stopcock is connected to the glass tube. Through the third side of the stopcock isosmotic water is injected either into the bore of the glass tubing or into the patient's vein by way of the connecting tube, depending on the setting of the stopcock.

To determine the venous pressure, using this apparatus, it is first necessary to inject a small amount of water into the patient to assure the patency of the needle and vein, Next the position of the valve is changed to allow the fluid to fill the glass tubing from below. Finally the valve is moved so that the lumen of the glass tube is connected with the connecting tubing and the water in the glass tube is allowed to flow into the patient by gravity until it ceases to flow. The number of millimeters of water remaining in the glass tubing at the time it stops flowing represents the venous pressure.

This type of manometer cannot be left connected directly to the patient's vein because the least increase in intravenous pressure will allow blood to enter the hollow bore needle in which it will clot and seal the system.

These difficulties are overcome by the instruments according to the present invention, practical embodiments of which are shown in the accompanying drawing, wherein:

FIG. 1 represents a perspective view of the instrument, mounted on a pole and in use;

FIG. 2 represents a front elevation of the instrument;

FIG. 3 represents a front elevation of a modified form of instrument, and

FIG. 4 represents a detail enlarged vertical section at the top of the instrument shown in FIG. 2, parts being broken away.

Referring to the drawings, the instrument comprises a large bore transparent tubular reservoir 1 which is connected at its lower end to a flexible tube 2 which is in turn connected to the hub 3 of a hollow bore needle 4 implanted in the vein of the patient, as indicated at A in FIG. 1. At its upper end the reservoir 1 has a plug 5 designed to accept the male intravenous connector 6 of a standard intravenous infusion connecting tube. Below the inlet, and within the lumen of the reservoir is a microdropper 7 which forms drops of the order of 0.01 cc. per drop. Also in the upper end of the reservoir there is an air inlet 8 which is provided with a filter 9 to screen out dust and bacteria from the lumen of the reservoir. The reservoir is mounted on a backing 10, marked in millimeters, which is provided with spring clips (not shown) on its back. The clips facilitate attaching the apparatus to a standard intravenous infusion stand S (FIG. 1) and further make it easy to move the scale up or down on the pole so that the zero point on the scale of the manometer is at the approximate level of the patient's right atrium, as shown in FIG. 1.

To take the venous pressure with this apparatus it is first clipped on the intravenous stand S and positioned so that the zero point on the scale is at the same approximate height above the floor as is the patient's right atrium. An intravenous infusion bottle 11 containing sterile isosmotic water is then connected to the adapter 6 at the top of the reservoir 1. The connecting tube 2 at the bottom of the reservoir is clamped shut, as by the clamp 12. The water is then allowed to run into the top of the reservoir until the latter is almost full. The clamp on the connecting tube 2 is released long enough for the water to fill the connecting tube. Then the connecting tube is connected to the hub of the needle 4 in the patient's vein and the clamp removed.

As in the case with the conventional side arm apparatus, the water level in the calibrated reservoir 1 will fall until it reaches the level which the intravenous pressure will support. The clamp 13 normally present on the intravenous infusion connecting tube 14 (FIG. 2) is then adjusted to permit a slow drip of water through the micro-dropper 7 into the top of the reservoir, thereby providing a constant flow of water through the hollow bore needle and assuring its patency. If the venous pressure falls, water will flow out of the reservoir into the patient at a faster rate than it drips in at the top. Hence the level in the reservoir will fall with a fall in venous pressure. If the venous pressure rises, fluid will flow out of the bottom more slowly than it drips into the top of the reservoir. Hence the level in the reservoir will rise with a rise in venous pressure.

A large bore tubular reservoir and a micro-dropper are used so that minor pressure changes will be damped out and the addition of each drop into the top of the tubular reservoir does not cause perceptible changes therein in the level.

Another, and even simpler design for a continuous recording venous pressure manometer is shown in FIG. 3.

The large bore tubular reservoir 15 is plugged with cotton 16 at its upper end to filter out dust and bacteria, but still allow air to freely pass in and out of the reservoir. At the lower end of the reservoir there is a "T" connector 17, which connects the reservoir, an intravenous connecting tube 18 and the connecting tube 19 to the needle 20 in the patient's arm. There is a clamp 21 on the flexible connecting tubing 19, and a C-clamp may also be provided on the tube 18.

To record venous pressure with this apparatus it is first placed in the vertical position on an intravenous stand by means of spring clips (not shown) on the back of the mounting board 22 and moved up or down the pole so that the zero point on the scale is approximately the same distance from the floor as is the patient's right atrium, all as explained above in connection with the form shown in FIGS. 1 and 2. An intravenous infusion bottle (not shown) containing sterile isosmotic water is attached by means of the standard intravenous connecting tube 18 to the female adapter 23 of the T connector 17. The clamp 21 on the flexible connecting tube 19 leading from the manometer is clamped shut. The water is then allowed to flow freely into the reservoir 15 until it is almost filled. The clamp on the flexible connecting tube is opened momentarily to allow this tube to fill to its male adapter end. It is then inserted into the hollow bore needle 20 in the patient's vein. A pinhole orifice 24 in the T connector 17 between the female adapter 23 and the reservoir controls the maximum rate of flow from the intravenous infusion bottle into the manometer. The maximum rate of flow through this orifice 24 must always be less than the maximum rate of flow through the hollow needle into the patient's vein, but at least as great as the rate of any backflow into the needle which might be expected to result from an increase in pressure of liquid in the vein.

If the intravenous pressure decreases, water will flow out of the reservoir and into the patient at a more rapid rate than water flows from the infusion bottle into the reservoir. The level in the reservoir will therefore fall concurrently with a fall in venous pressure. Conversely, if the venous pressure rises, water will flow more rapidly from the infusion bottle into the reservoir than from the reservoir into the patient's vein. Hence the level in the reservoir will rise paralleling the rise in venous pressure.

If continuous observation is not required in any particular instance, either form of manometer may be used in the normal manner, simply by eliminating the drip feed of the form shown in FIGS. 1 and 2, or by plugging up the inlet 23-24 of the T connector 17 by means of a simple plug or cap (not shown).

It will be apparent that the damping out of minor pressure variations and the establishment of a significant water level in the calibrated (scaled) tube result from the provision of a free water surface of such area that its level will not change noticeably by the addition of water at a drop by drop rate. In the embodiments illustrated and described above, the free water surface is provided in the large bore tubular reservoir 1 or 15. The same indications could be obtained, if desired, by observation of a small bore calibrated tube, provided that it were connected to a reservoir having a free water surface of sufficient area (e.g., in the form of a U-tube having a small side calibrated and a large side out of sight). Reference herein to a "large bore tubular reservoir" will be understood to include any tube or combination of tubes providing the free water surface required, as explained above.

It will be understood that various changes may be made in the form, construction and arrangement of the several parts without departing from the spirit and scope of the invention, and hence I do not intend to be limited to the details shown or described herein except as the same are included in the claims or may be required by disclosures of the prior art.

What I claim is:

1. A manometer adapted for continuous measurement of venous pressure comprising a tubular reservoir having a bore of substantial cross-sectional area, means for supporting said reservoir in an approximately vertical position at a desired adjusted height, a hollow bore needle adapted for insertion into a vein of a patient, flexible tubing connecting the bottom of said reservoir with said needle, means for supplying liquid to the interior of the system constituted by the reservoir and tubing, a calibrated scale associated with the reservoir to indicate continuously the position of the fluid surface therein, and means defining an opening leading from said liquid supply means to said system for limiting the rate of liquid supply to a rate at least as great as the minimum flow of liquid through the needle permitted by the pressure of blood in said vein but not substantially greater than said permitted rate, said opening being of lesser cross-sectional area than that of the bore of said needle.

2. A manometer according to claim 1 in which the liquid supply limiting means includes a micro-dropper in the upper portion of the reservoir.

3. A manometer according to claim 2 in which the means for supplying liquid includes a container for isosmotic liquid, a conduit for conducting said liquid to said micro-dropper and adjustable means for controlling the rate of flow of the liquid through said conduit.

4. A manometer according to claim 1 in which the liquid supply limiting means includes a pinhole orifice between the liquid supply means and the system constituted by the reservoir and tubing.

5. A manometer according to claim 4 in which the means for supplying liquid includes a container for isosmotic liquid, a conduit for conducting said liquid to said pinhole orifice and adjustable means for controlling the rate of flow of the liquid through said conduit.

6. The method of visually indicating the venous pressure in a living body, which includes providing a liquid-containing system comprising a reservoir and a hollow bore needle, placing the bore of the needle in communication with a vein of the patient, causing the level of liquid in the reservoir to stand at a point indicative of the pressure of blood in said vein, supplying liquid to said reservoir at a rate sufficient to prevent back flow of blood into said needle bore, and reading the fluctuations in the said liquid level to obtain a continuous indication of the venous pressure.

7. The method according to claim 6 which includes determining the constant elevation of liquid level in the reservoir attributable to said supplying of liquid, and reading the fluctuations in the said liquid level with adjustment by the amount of said constant to obtain a continuous indication of the absolute venous pressure.

References Cited by the Examiner

UNITED STATES PATENTS

| | | | |
|---|---|---|---|
| 915,329 | 3/1909 | Bishop et al. | 128—2.05 |
| 2,535,998 | 12/1950 | Bierman | 128—2.05 X |
| 2,600,324 | 6/1952 | Rappaport | 73—388 |
| 2,625,153 | 1/1953 | Baum | 128—2.05 |
| 3,000,540 | 9/1961 | Wheeler | 222—14 |
| 3,056,403 | 10/1962 | Gewecke | 128—214 |

References Cited by the Applicant

UNITED STATES PATENTS 2,648,328   8/1953   Hathaway et al.

RICHARD A. GAUDET, *Primary Examiner.*

SIMON BRODER, *Examiner.*